March 22, 1966    H. M. FRANKLIN    3,241,515
MULTIPLE TURN INDICATOR
Filed Dec. 2, 1963    2 Sheets-Sheet 1
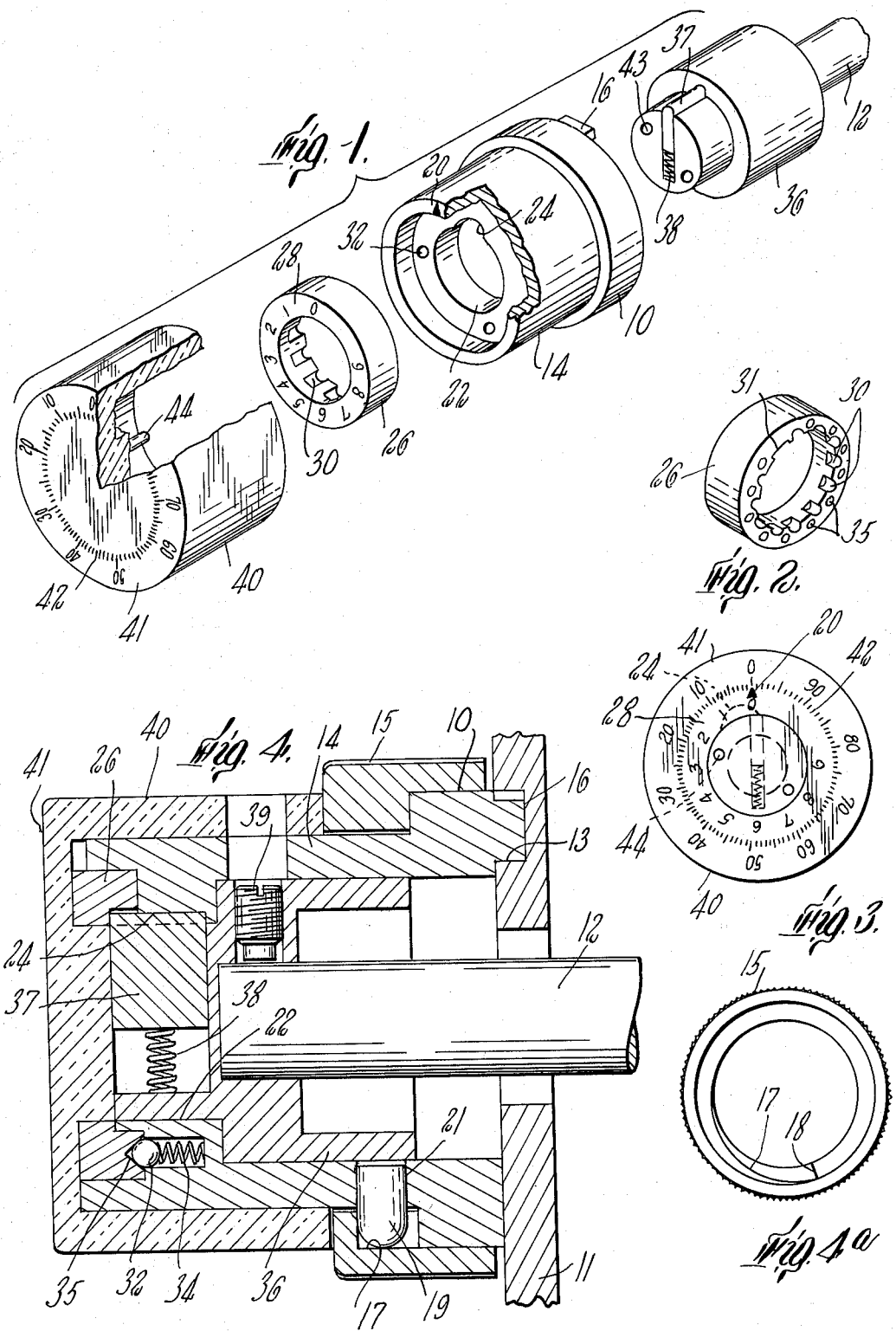

March 22, 1966  H. M. FRANKLIN  3,241,515
MULTIPLE TURN INDICATOR
Filed Dec. 2, 1963  2 Sheets-Sheet 2
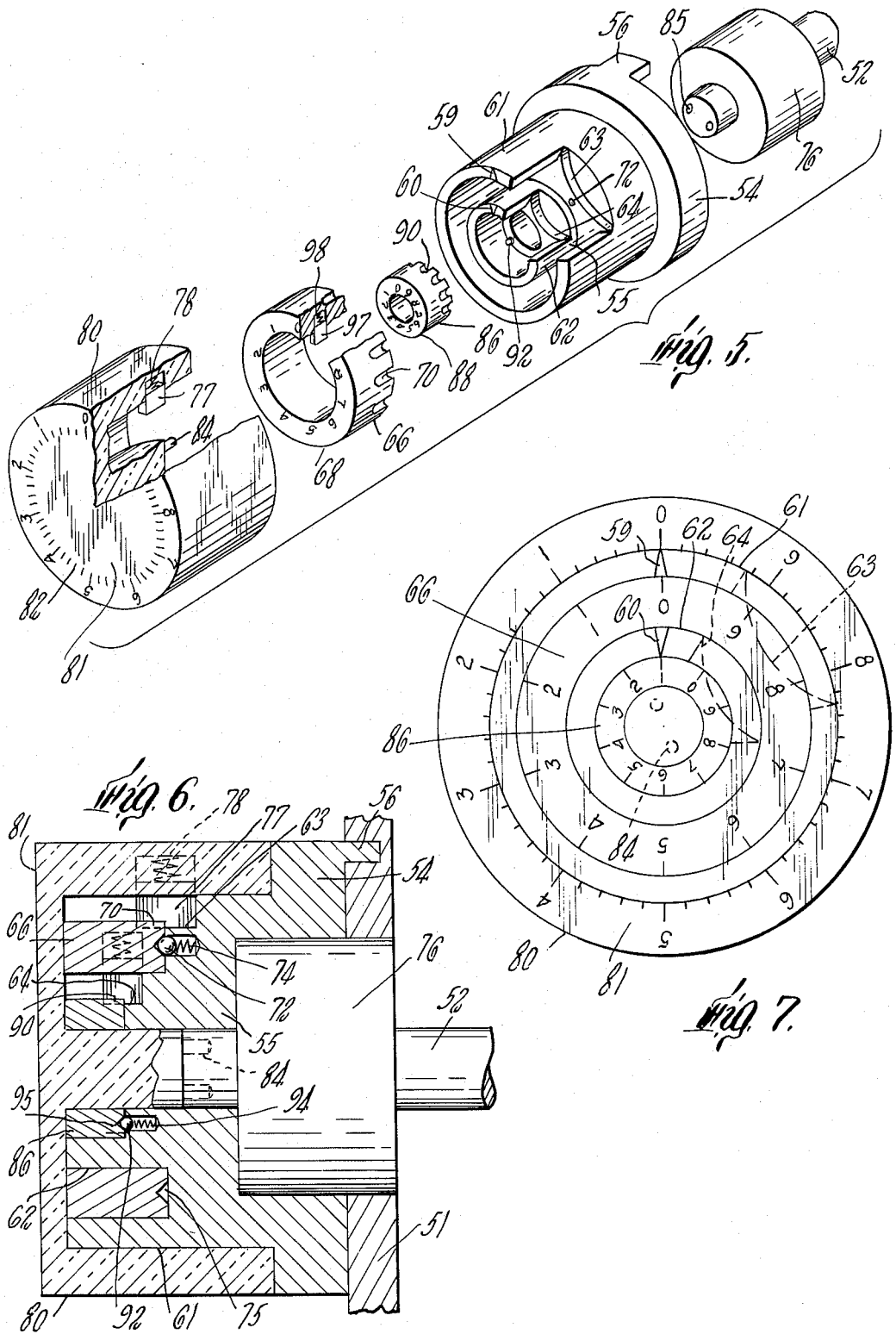

United States Patent Office 3,241,515
Patented Mar. 22, 1966

3,241,515
MULTIPLE TURN INDICATOR
Harlow M. Franklin, Natick, Mass., assignor to Waters Manufacturing, Inc., Wayland, Mass., a corporation of Massachusetts
Filed Dec. 2, 1963, Ser. No. 327,334
6 Claims. (Cl. 116—124)

This invention relates to a multiple turn and angular position indicator and knob for a rotatable control shaft. Such turn and position indicators are useful with the rotatable control shafts of potentiometers and similar devices to indicate the precise angle of turn of the shaft with relation to a zero or other reference point, the probable angle of turn sometimes extending beyond a single full rotation of 360°.

A general object of this invention is to provide, for a rotatable control shaft, a control knob with a multiple turn and angular position indicator that is small in size and is composed of comparatively few parts that may be inexpensively and easily fabricated and assembled.

Another object is to provide a turn and position indicator knob of the class described that will give dependable and accurate indication of the angular position or fractions of a single turn of the shaft as well as a true indication of the number of full turns made by the shaft.

A further object of this invention is to provide, in an indicator of the class described, means to protect and shield from damage and from dirt the mechanisms and dials of the indicator and of the device controlled by the shaft.

A still further object is to provide an arrangement for locking an indicator knob in any angular control position when desired, thus locking the shaft and the device controlled by the shaft.

These and other objects of the invention are met generally by providing, for a rotatable shaft extending from a housing, panel or other support member, a position indicator including a fixed body secured against rotation to the support member adjacent the shaft, this fixed body carrying an arrow or line serving as a visual reference point. A number wheel is rotatably mounted with respect to the fixed body and carries an indicating dial with a series of numbers movable past the visual reference point. Covering the fixed body and the number wheel is a knob which is secured to the shaft for rotation therewith, the knob also carrying an angle indicating dial with a scale movable adjacent the reference point to show degrees or fractions of a turn of the shaft that are less than a full turn. The angle indicating dial of the knob, the number indicating dial on the wheel and the visual reference point are simultaneously visible for observing their relative positions, preferably by making the face of the knob transparent. A cam operated element, actuated once upon each full rotation of the knob and shaft, advances the number wheel one step each time the knob is turned through a full circle of 360°.

To maintain the knob and shaft in any position of adjustment, there may be provided a locking ring, rotatably mounted on the fixed body, with a cam surface arranged to wedge a pin against the shaft to lock the knob and shaft against rotation when desired.

A modification of the invention includes a second number wheel which is advanced by another cam operated element one step every time the first number wheel completes a full revolution. Within the practical limits of space available, further number wheels may be added to multiply the number of full turns that may be indicated in a device according to the invention.

Other objects, advantages and further details of that which is believed to be novel and included in this invention will be clear from the following description and claims, taken with the accompanying drawings in which are illustrated two examples of multiple turn and angle indicators embodying the present invention and incorporating the features above generally described.

In the drawings:

FIG. 1 is an exploded front perspective view of the parts of a ten-turn indicator according to this invention, parts being broken away for clarity in illustration;

FIG. 2 is a perspective view of the number wheel element illustrated in FIG. 1, shown as if looking in the opposite direction;

FIG. 3 is a front elevational view of the indicator of FIG. 1, assembled, showing the parts in their zero angle and no turn position;

FIG. 4 is an enlarged vertical cross-sectional view through the indicator substantially on an axial line;

FIG. 4a is a rear elevational view of a locking ring, apart from the rest of the assembly;

FIG. 5 is an exploded front perspective view like FIG. 1 but showing a modification with two number wheels for indicating up to one hundred turns;

FIG. 6 is an enlarged axial section like FIG. 4 but showing the modification, and FIG. 7 is an enlarged front elevational view like FIG. 3 showing the indicator of the modified form with the dials in their relative positions as if ten full turns of the shaft had been completed.

In the exemplary form of the invention shown in FIGS. 1 through 4 a stationary support member 11, which may be a panel or a wall of a housing, carries a rotatable shaft 12 extending therefrom. It is the amount of rotation of this shaft which is to be shown by the indicator of the present invention. The shaft is the control element for a multiple turn potentiometer or similar device which need not be shown.

Surrounding the extended end of the shaft is a fixed, generally cylindrical body 14 which is suitably secured to the support panel or member 11, having a boss 16 that enters an appropriate recess 13 in the member 11 to prevent rotation of the fixed body 14.

For the purpose of locking the shaft 12 and the indicating knob (hereinafter described) in any desired position of rotation, there may be provided a knurled locking ring 15, rotatably mounted about the base 10 of the cylindrical body 14. The interior of this ring has a cam surface 17 thereon inwardly spiraling from a stop shoulder 18 and against which cam surface a locking pin 19 will bear at its outer end. The pin may be made of a plastic and is slidably mounted in a radially extending hole 21 in the fixed body 14, as seen in FIG. 4, with the inner end of the pin opposite the shaft 12 or rather the collar 36, hereinafter described as fixed to the shaft. When the ring 15 is turned in one direction so that the inwardly spiraling portion of its cam surface moves toward the body 14 next to the pin 19 in the hole 21, the pin will be forced radially inwardly to jam or wedge the shaft and prevent its rotation. To unlock the shaft, the locking ring 15 is turned in the reverse direction so that the spiraling cam portion 17 moves outwardly opposite the outer end of the pin 19, and the pressure of the inner end of the pin against the collar 36 will be released. When the side of the pin strikes against the stop shoulder 18, the locking ring has reached the limit of its rotation in unlocking direction.

For purposes that will later become apparent, the exposed end or edge of the hollow cylindrical body 14 is provided with an indicia or mark 20 in the form of an arrow which will serve as a visual reference point or line. The interior of the body 14 in this form of the invention is provided with a circular cam track 22 which has a cam notch 24, shown as a radially outwardly extending dwell angularly traversing a space effectively equal to the space between adjacent numbers on the number wheel 26. This number wheel is actually a hollow cylindrical member or ring rotatably mounted on or in the fixed body 14 and bears on its outer face an indicating dial 28 with a series of regularly spaced numbers thereon.

As the number wheel is rotated, the numbers on the dial move adjacent the arrow or indicia mark 20 to show the position of the wheel, expressed as a number of turns of the shaft.

On the inner periphery of the number wheel in this form, there is a series of regularly spaced indexing recesses 30, which may be called cam notches, the center spacing between adjacent recesses 30 being the same as the angular spacing between the numbers on the dial 28. In this form of the invention, and assuming that no more than ten turns of the shaft will be made in the clockwise direction away from the indicia mark 20, the numbers on the dial will run from 0 to 9 and there will be an indexing recess or notch corresponding to each one of the number locations on the dial. However, between the number 9 and the number 0 on the dial there may be provided more than the regular space between the rest of the numbers, and the spacing between the recesses 30 corresponding to 9 and 0 may be greater than the regular spacing between the other numbers.

In order to permit the shaft to overtravel, assuming that the device being actuated has stops with some degree of flexibility on each end of a ten-turn shaft rotation, for example, a wide "zero holding" notch 31 is provided in the number wheel 26, in the angular space beyond the recess 30 corresponding to 0 position. Without this wide notch, if the shaft were forced beyond the ten-turn stop, as by twisting the shaft beyond the 0 position, the cam follower 37 might fall into the next recess 30, carrying the number wheel with it, and falsely count a "1" when the forced shaft was allowed to return. With the wide "zero holding" notch 31, the cam follower can fall into and move within this notch when the shaft is forced beyond the 0 position. Therefore, when the shaft springs back after release from forcing beyond the stop, the wheel is returned to the proper position, it has not been indexed, and there will be no false reading when the shaft is again at rest or is moved in the proper forward direction from the stop.

In order to hold the number wheel definitely in any one of its indexed positions, with a number opposite the indica 20 on the fixed body, one or more detent balls 32, or they may be rounded-end detent pins, are carried by the fixed body opposite the rear face of the number wheel 26 and these detent members are resiliently pressed by springs 34 into engagement with detent recesses 35 in the rear face of the wheel arranged at regular center spacings equal to the spacing between the numbers on the wheel and the spacing between the indexing recesses 30.

The number wheel is moved one step for each complete rotation of the shaft and for this purpose there is provided a shaft coupling collar 36 which, in the first form of the invention also serves as a retainer for a cam follower or slide 37 which works in a radial direction extending outwardly of the collar 36, being pressed as as by a spring 38 housed within the slot which slidably retains the cam follower 37. The shaft collar 36 is suitably fixed to the end of the shaft as by a set screw 39 which may be reached by a screw driver through suitable aligned openings in the various parts when they are in their zero or null-indicating positions.

The shaft is rotated by a driver and indicator control knob 40 which covers and surrounds most of the fixed body 14 and also covers the number wheel 26. As shown, the control knob is preferably in the general shape of a hollow cylinder closed at one end as at 41, where a suitable fractional turn or angle indicating dial 42 is provided, the scale of this dial being arranged to move adjacent the indicia arrow 20. The knob 40, or at least the front face 41 thereon, is made of a material that is entirely transparent so that the dial 42, the reference point 20 and the number indicating dial 28 are all visible simultaneously to observe their relative positions. The scale of the angle indicating dial 42 may be marked in hundredths of a turn as shown, in degrees, or in some other desirable units. Whatever scale is used, it should indicate the fraction of a complete circle that the shaft is turned away from the reference indicia 20, and for this reason the knob and shaft are fastened together as by drive studs or pins 44 which extend inwardly from the end wall 41 of control knob 40 and engage frictionally in holes 43 in the outer end of the shaft collar 36 and thus secure the knob to the shaft so that they may turn together as a unit. As explained earlier, the locking ring 15 may be used to fix the shaft in any adjusted position, by forcing the pin 19 against this collar 36. The drive studs or pins 44 fit the holes 43 with a friction force fit to hold the knob on the collar 36 and secured with respect to the shaft 12.

In operation of the indicator according to FIGS. 1 through 4 it will be assumed that both the number wheel and the driving knob are in their zero positions as shown in FIG. 3 and that the shaft is also in its null-position, ready to be turned in clockwise direction only. The locking ring is turned to free the shaft for rotation. As the knob and shaft start to turn together, the scale of the dial 42 on the knob will indicate opposite the reference arrow 20 the fractional or angular turn of the shaft, cam follower 37 being retracted by engagement against the circular part of the cam track 22 so that it cannot engage in any of the indexing recesses 30 in the number wheel. The detents 32 for the wheel hold this ring with its dial in the zero position. As the knob and shaft approach their full turn position, the cam follower 37 starts to slide radially outwardly at the beginning of the left-hand edge of the cam notch 24 until the outer tip or edge of the slide engages within one of the indexing recesses 30 in the number wheel corresponding to the next number. Further turning of the knob and shaft will then overcome the holding of the detents and drive the wheel while the cam follower is in engagement with the indexing recess 30. As the number wheel and knob move together and the cam follower 37 approaches the right hand side of the dwell 24, the cam follower is again retracted by the dwell to ride on the circular portion 22 of the cam track and the follower is withdrawn from the indexing recess 30 of the number wheel. Detents 32 on the wheel will again center and hold the wheel in its newly indexed position with a new number opposite the reference arrow 20. Further full turns of the shaft and knob will index the number wheel to progressively increasing numbers to indicate full turns by the number indicating dial 28, fractions of turns between full turns being indicated by the angle indicating knob dial 42.

The cam dwell or notch 24 is made symmetrical so that between the stop positions of the shaft the cam slide is actuated and the number wheel is indexed through one position in each rotation, no matter in which the direction the knob and shaft are rotated. Thus, the net amount of turning of the shaft clockwise away from the zero reference point is indicated by the invention at any time, as long as this turning is above zero and does not exceed ten turns in the first example shown. Obviously, some greater or lesser number of turns might be indicated by the number wheel, depending upon the requirements of a particular installation, and the dial on the number wheel may be appropriately marked. To give some idea of the size of the devices here involved, an entire assembly may not exceed 1⅛ inches in diameter or in depth.

In order to increase the capacity of an indicating control knob according to this invention, the modified constructions illustrated in FIGS. 5 through 7 may be used. In this form of the invention, 51 indicates the panel or other supporting member through which the end of a rotatable shaft 52 extends. A fixed generally cylindrical outer body 54 surrounds the shaft and this body has an inner generally cylindrical portion 55 for purposes that will later appear. A boss 56 on the fixed body will prevent its rotation with respect to the supporting member 51 to which it is secured. A locking ring and pin like those in the first form may be provided.

A visual reference point or line is provided on the body as by the arrow 59 on the exposed outer end or edge of the body 54 and a similar arrow 60 on the exposed edge of the inner cylinder 55.

In this form of the device the outer surface 61 of the fixed body 54 serves as an outer circular cam track for a first cam follower 77 while the outer surface 62 of the inner cylinder 55 serves as an inner circular cam track for a second cam follower 97. The outer cylindrical cam track 61 is provided with a cutaway portion, the body 54 having a radially inwardly extending cam notch or dwell 63 at that point in its circumference. The inner circular cam track 62 has a similar cutaway portion where the inner cylinder 55 is provided with a radially inwardly extending cam notch or dwell 64. Both the cutaway portions and the notches corresponding thereto span or traverse an angle effectively equal to the space between adjacent numbers on the number wheels.

In this form, the first or outer number wheel 66 is provided with a number indicating dial 68 and indexing recesses 70 on its outer periphery at regularly spaced intervals corresponding to numbers on the dial and engageable by a cam follower or slide 77 sliding radially inwardly each time the follower passes through the dwell 63 in the cutaway portion of the outer cam track 61. Detent pins or balls 72 with springs 74 are urged into detent recesses 75 on the back of the first number wheel to hold the wheel in indexed position when it is not being driven by the cam follower.

In this form of the invention the shaft coupling collar 76 may carry or constitute a bearing for low friction rotative support of the shaft in the supporting member or panel 51. If a locking ring is used, the collar 76 must be fixed to the shaft.

A compression spring 78 constantly urges the tip of the cam follower or slide 77 inwardly against the circular cam track 61 and its dwell 63, this resilient cam follower being carried by the cylindrical portion of the control or driver knob 80. As before, the knob is used as an angle indicator and has thereon a transparent front face 81 carrying a fractional turn or angle indicating dial 82. Studs or pins 84 frictionally engage within holes 85 and secure the knob 80 to the end of shaft 52 or to the coupling collar 76 so that the knob and shaft turn together as at unit.

In a manner similar to the first form, but in some respects oppositely-acting, the outer cylindrical wall of the knob 80 serves as a retainer for cam follower or slide 77, which works in a radial direction, in this case extending inwardly, being pressed as by spring 78, housed in the slot that slidably retains the cam follower 77. During most of the rotation of the knob 80, the active tip or edge of the slide 77 rides on the outside of the circular cam track 61 and is thus retracted within its slot in the knob. As the knob 80 approaches full turn position, the slide 77 reaches the cutaway portion in the cam track and about half of the edge or tip of the slide engages the beginning of the dwell 63, and under pressure of spring 78 slide 77 starts to slide radially inwardly as the slope or curve of the dwell departs from the circular track. The inward sliding continues as the knob turns, until the inwardly directed tip of the slide, at the other half of its edge, engages within one of the indexing recesses 70 on the outside of the number wheel 66.

Further turning of the knob will then overcome the holding of the detents 72 on the back of number wheel 66 and move the wheel in unison with the knob while the follower or slide 77 is in engagement with the recess 70. As the number wheel and knob move together and the cam follower or slide approaches the other end of the dwell 63, the slide is retracted or lifted outwardly by the changing slope of the dwell until its edge again rides on the circular portion 61 of the cam track. As this occurs, the edge of the slide 77 is withdrawn outwardly from the indexing recess 70 of the number wheel, the wheel is no longer driven by the slide, and detent 72 engages in another recess 75 on the wheel to again center and hold the wheel in its newly indexed position.

It will be noted that the number indicating dial on the ring wheel 66 bears but ten digits, 0 and 1 through 9 in the usual order, with the same spacing between the digits 9 and 0 as between the digits 0 and 1 and the other digits. Thus the number wheel 66 will count turns progressively clockwise from 0 to 9 and back to 0 again. Assuming that the shaft is capable of a number of turns in excess of nine and an indication of this is desired, a second number wheel 86 is provided. In the form shown in this modification the second number wheel 86 is also a hollow cylindrical ring having number dial 88 on its outer end or edge movable adjacent the inner reference arrow 60 on the inner cylinder 55 of the fixed body. The wheel 86 has indexing cam notches 90 in its outer periphery and detent balls 92 are pressed by springs 94 toward detent recesses 95 to hold this wheel in any one of its indexed positions.

The first number wheel 66 in this form of the device carries a cam follower or slide 97 pressed by a spring 98 to slide radially inwardly toward and against the inner circular cam track 62 and its cam notch or dwell 64. When the cam follower or slide 97 is in the dwell 64 it will engage with one of the indexing cam notches 90 in the wheel 86 and turn this wheel through one number or indexing position as the first numbering wheel completes its travel from the 9 position back to the 0 position upon ten full revolutions of the knob and shaft. In this way, the second number wheel 86 will be turned one index position upon every ten full turns of the knob and shaft in clockwise direction. Referring to FIG. 7 it will thus be seen that the various dials indicate that the knob has been turned through ten full revolutions, the first number wheel 66 has indexed ten times to complete a single full revolution and the number wheel 86 has just been indexed once through one tenth of a revolution. Reading from the inside out, the dials indicate "1–0–0," which means ten and no fractions of a turn. A device built according to this modification can therefore indicate up to 100 full revolutions of the shaft with fractional or angular shaft positions at any point within the 100 turns. Obviously, within the practical physical limits of size which may be imposed or encountered in constructing the indicator, by adding further cam-operated wheels within the second number wheel 86, a device may be built to indicate any number of turns.

The operation of the outer number wheel 66 and its cam follower or slide 97 with respect to the circular cam track 62 and cam notch or dwell 64, and the actions of these parts in moving and indexing the inner number wheel 86 by engagement with one of its indexing recesses 90, need not be described because it is the same operation as that of the knob 80, follower 77, track 61 and dwell 63 in turning wheel 66 with its recesses 77, as previously described. Detent 92 engages with recesses 95 to center and hold the inner wheel in position when not being indexed.

Although the front face of the driver and indicating knob must be made transparent, the entire knob, including its cylindrical portion which overhangs the cylindrical fixed body may or may not also be transparent and the knob molded in a single piece of suitable plastic as shown. Furthermore, the knob may be provided with a knurled surface for easy turning by hand or it might be provided with gear teeth on its outer edge for fine control of its degree of rotation and therefore rotation of the shaft. Such knurling or gear teeth are conventional and well understood.

The cylindrical portion of the knob, where it overhangs the cylindrical portion of the fixed body of the device, serves as a cover and dust seal against particles which might enter and damage the mechanism of the indicator itself or the mechanism being controlled by the shaft. If desired, according to the first form of the invention here shown, the cylindrical portion of the knob may be eliminated if the dust protection is of no importance. In the form shown in FIGS. 5 through 7, the cylindrical portion of the knob need only be deep enough to carry the cam slide 97 and its spring 98.

It will be noted that the dial on each number wheel is covered by the transparent front face of the knob and that this knob face also covers the reference point or indicia mark against which readings are made. This protects these marks against outside dirt or damage. Similarly, the fractional turn or angle indicating dial on the knob itself might be protected against outside dirt or damage by engraving or molding it on the inner wall of the transparent face where it is free from abrasion or accidental damage.

As will be evident from the foregoing description, certain aspects of this invention are not limited to the particular details set forth as examples, and it is contemplated that various and other modifications and applications of the invention will occur to those skilled in the art. It is therefore intended that the appended claims shall cover such modifications and applications as do not depart from the true spirit and scope of the invention.

What is claimed as new and is desired to be secured by Letters Patent of the United States is:

1. In combination with a rotatable shaft projecting from a support member, a position indicator comprising
   a fixed body secured against rotation to said support member and projecting adjacent said shaft,
   a visual reference point on said body,
   a number wheel rotatably mounted with respect to said body,
   an indicating dial on said wheel with a series of regularly spaced numbers movable adjacent said reference point,
   a knob rotatable with respect to said body and said wheel, said knob being secured to said shaft for rotation therewith,
   an angle indicating dial on said knob with a scale movable adjacent said reference point,
   means rendering said angle indicating knob dial, said number indicating wheel dial and said reference point simultaneously visible for observing their relative positions,
   cam operated means rotatable with said knob and shaft, active for indexing said wheel between adjacent number indicating positions on said wheel dial as said knob is turned, and
   detenting means for said wheel, releasably holding it in a number indicating position adjacent said reference point when said cam operated means is inactive.

2. In combination with a rotatable shaft extending from a support member, a position indicator comprising
   a fixed body secured against rotation to said support member and surrounding said extending shaft,
   a visual reference point on said body,
   a first number wheel rotatably mounted with respect to said body,
   an indicating dial on said wheel with a series of regularly spaced numbers movable adjacent said reference point,
   a knob rotatable with respect to said body and said first wheel, said knob being secured to said shaft for rotation therewith,
   an angle indicating dial on said knob with a scale movable adjacent said reference point,
   a second number wheel rotatably mounted with respect to said first wheel,
   an indicating dial on said second wheel with a series of regularly spaced numbers movable adjacent said reference point,
   cam operated means rotatable with said knob and shaft, active for indexing said first number wheel between adjacent indicating positions on said first wheel dial as said knob is turned,
   cam operated means rotatable with said first number wheel, active for indexing said second number wheel between adjacent indicating positions on said second wheel dial as said first wheel is turned, and
   means rendering said angle indicating knob dial, said number indicating wheel dials and said reference point simultaneously visible for observing their relative positions at all times.

3. In combination with a rotatable shaft extending from a support member, a position indicator comprising
   a fixed body secured against rotation to said support member and surrounding said extending shaft,
   a visual reference point on said body,
   a number wheel rotatably mounted with respect to said body,
   an indicating dial on said wheel with a series of regularly spaced numbers movable adjacent said reference point,
   a knob rotatably covering said reference point on said body and said dial on said number wheel, said knob being secured to said shaft for rotation therewith,
   an angle indicating dial on said knob with a scale movable adjacent said reference point,
   a transparent face on said knob rendering said number indicating wheel dial and said reference point simultaneously visible with said angle indicating knob dial for observing their relative positions,
   a cam track on said fixed body having a dwell at one position, said dwell angularly traversing a space effectively equal to the space between adjacent numbers on said wheel,
   a cam follower rotatable with said knob and shaft and having a tip pressed and riding against said cam track,
   a series of regularly spaced indexing recesses on said wheel engageable by said follower tip when said knob and shaft are rotated and said tip rides in said dwell, for indexing said wheel between adjacent number indicating positions on said wheel dial as said knob is turned,
   said cam follower tip being otherwise retracted by said cam track and disengaged from said wheel when riding outside of said dwell, and
   detenting means releasably holding said wheel in a number indicating position adjacent said reference point when said cam follower tip is retracted.

4. In combination with a rotatable shaft extending from a support member, a multiple turn and angular position indicator comprising
   a hollow cylindrical fixed body secured against rotation to said support member and surrounding said extending shaft,
   a visual reference point on one end of said body,
   a hollow cylindrical number wheel rotatably mounted on said body,
   an indicating dial on said wheel with a series of regularly spaced numbers movable adjacent said reference point to indicate turns of the shaft, a control knob rotatably covering and substantially surrounding said body and said wheel, said knob being secured to said shaft for rotation therewith, an angle indicating dial on said knob with a scale movable adjacent said reference point, a transparent end wall on said knob rendering said angle indicating knob dial, said number indicating wheel dial and said reference point simultaneously visible for observng their relative positions, a cam track on said fixed body having a circular form with a radially extending dwell in its periphery at one position, said dwell angularly traversing a space effectively equal to the space between adjacent numbers on said wheel dial, a resiliently pressed radially extending cam follower rotatable with said knob and shaft and having a tip riding against said cam track, a series of regularly spaced indexing recesses on said wheel engageable by said follower tip when said knob and shaft are rotated and said tip rides in said cam track dwell, for indexing said wheel between adjacent number indicating positions on said wheel dial as said knob is turned, said cam follower tip being retracted by the circular portion of said cam track and disengaged from said wheel when riding outside of said dwell, and detenting means between said fixed body and said wheel, releasably holding said wheel in a number indicating position adjacent said reference point when said cam follower tip is disengaged from said wheel.

5. An indicator as claimed in claim 1 comprising additionally a ring rotatably mounted on said fixed body, a cam track on said ring and a sliding pin with one end adjacent said cam track and the other end adjacent said shaft, rotation of said ring causing said cam track to move said pin toward said shaft to lock it.

6. An indicator as claimed in claim 1, the entire said knob being composed of transparent material to render the knob dial, number wheel dial and reference point simultaneously visible.

References Cited by the Examiner

UNITED STATES PATENTS

| | | | |
|---|---|---|---|
| 2,532,970 | 12/1950 | Van Dyke | 116—133 |
| 2,539,575 | 1/1951 | George | 116—133 |
| 2,558,326 | 6/1951 | Van Dyke | 338—149 |
| 2,746,417 | 5/1956 | McCord et al. | 116—115 |
| 2,805,636 | 9/1957 | Smith | 116—115 |
| 2,861,536 | 11/1958 | Polivka | 116—124 |
| 2,881,295 | 4/1959 | Brown | 338—120 |
| 2,901,998 | 9/1959 | Keith | 116—115 |
| 2,914,153 | 11/1959 | Krause et al. | 192—8 |
| 2,980,055 | 4/1961 | Burns | 116—124 |
| 3,136,294 | 6/1964 | Arnold et al. | 116—115 |

LOUIS J. CAPOZI, *Primary Examiner.*